Patented Aug. 10, 1926.

1,595,765

UNITED STATES PATENT OFFICE.

ALBERT K. EPSTEIN, CHICAGO, ILLINOIS.

EGG PRODUCT AND PROCESS FOR PRODUCING THE SAME.

No Drawing.      Application filed October 5, 1925. Serial No. 60,676.

My invention relates to egg products and process for producing the same, being directed more particularly to a new composition of matter to be used in the manufacture of salad dressing products which contain oil in emulsified condition. By salad dressing is meant the generic term applied to a number of food products which consists of emulsion of vegetable oils with vinegar, spices, condiments and egg substances, and other food ingredients.

It is most desirable that the egg products used for the emulsification should contain as few living organisms as possible, as otherwise the product will decompose and will not keep well.

In my co-pending application, Serial No. 60,677, filed of even date herewith, I describe the manufacture of an emulsifying agent consisting of a suitable mixture of yolk substance, an organic water soluble substance having one or more hydroxyl groups in combination with an acid of an edible nature. This mixture is frozen to a solid mass and kept in this condition until it is to be used. It is then allowed to thaw out at a warm temperature, below the coagulation point of the albumen and may then be used as an emulsifying agent.

This product as disclosed and claimed in my said co-pending application is a very satisfactory one for use in some cases, but when used for the manufacture of salad dressings of the character referred to herein it has certain shortcomings, such as its tendency to an undesirable increase in living organisms during the thawing period.

One of the features of the present invention is the prevention of decomposition and the multiplication of living organisms during this thawing period, so as to make this other product useful for additional purposes. To this end I add to the egg product of my said other application before freezing, a suitable quantity of mustard oil, natural or synthetic, or other essential oils having a condimental value and preserving action, such as essential oil of capsicum.

The amount of mustard oil or other essential oils added is relatively small as compared with the amount of egg product used and it is difficult to distribute uniformly so small an amount of oil in a large volume of egg product. Furthermore, the preferable essential oil as mustard oil is not soluble in the egg product and to be most effective should be minutely dispersed.

In carrying out my invention I first dissolve the mustard oil in a relatively larger quantity of a suitable solvent of an edible nature and disperse the solution into the other ingredients of the egg product.

I have found that I can dissolve the mustard oil in glacial acetic acid which has been melted. I can also dissolve the mustard oil in esters of an edible nature such as monoacetin or in substances such as ethylene glycol.

In case I dissolve the mustard oil in glacial acetic acid, I first warm the glacial acetic acid at a temperature at which it is liquid and then add to it the mustard oil. I then disperse the mustard oil and glacial acetic acid mixture in a larger volume of glycerine, ethylene glycol or similar equivalent substances, and then add it slowly to the yolk by mixing in a suitable well known mixer. In this manner a very small amount of mustard oil may be uniformly dispersed in a very much larger amount of egg substance.

In addition to the mustard oil, I may also introduce into the egg substance relatively small amounts of other condimental and flavoring ingredients by dissolving in acetic acid and similar solvents the various essential oils or bringing the acetic acid in intimate contact with the condiments thus dissolving out the various flavoring and condimental constituents.

The above mixture before adding to the yolk product is first filtered, whereby the acetic acid will have in solution the flavoring and condimental ingredients leaving behind the cellulose and starch material.

As an illustration of my preferred product I suspend in 4 pounds of glacial acetic acid 2 pounds of powdered paprika or as it is called, *Capsicum annuum*. It is preferable to heat the acid as stated and add the paprika, mixing it well. This is now filtered so that the acetic acid will contain the condimental ingredients as well as a large portion of the red coloring matter of the paprika powder. I then take 1 pound of the filtrate containing the condimental ingredients of the red paprika and red coloring matter, heating it as stated, and dissolve in it ⅓ ounce of mustard oil. This mixture is then dispersed into 5 pounds of glycerine and added to 94 pounds of said yolk substance, and thoroughly mixed. By yolk substance I mean the commercially separated matter. In such cases there is usually a small amount of the white which adheres to the yolk, but that is not detrimental although it is best to keep it to a minimum.

The yolk substance will thus contain the condimental ingredients of mustard and of paprika in a uniform dispersed condition, without the cellulose and starchy material of the original mustard flower and powdered paprika. Furthermore, the yolk substance will contain an oil soluble red coloring matter which was extracted from the red paprika.

This product is now subjected to a freezing temperature and kept at this temperature until ready to be thawed out for use.

There is an advantage in using in a food product containing carbohydrates and raw egg material the essential oils of condiments, rather than the original condiments themselves. Commercial mustard flour or ground paprika contain usually yeast molds and spores and when these condiments are diluted with the other ingredients of the mayonnaise products, bacterial decomposition may take place by the introduced organisms. If, however, the essential oils are extracted from the condiments the introduction of the organisms is obviated and the finished product still has condimental value.

What I claim as new and desire to secure by United States Letters Patent is:—

1. The method of producing an emulsifying agent consisting of adding to egg yolk treated with an edible water soluble organic compound containing a hydroxyl group capable of preventing denaturing of egg protein during freezing and an edible acid for increasing the water imbibing capacity of the yolk to retain its fluidity and without diminishing its viscosity after freezing and thawing, an essential oil having a condimental value and preserving action to prevent decomposition during thawing.

2. The method of producing an emulsifying agent consisting of adding to egg yolk treated with glycerine and acetic acid to retain its fluidity and viscosity after freezing and thawing, an essential oil having a condimental value and preserving action to prevent decomposition during thawing, and then freezing the mixture and maintaining it frozen until thawing it out for use.

3. The method of producing an emulsifying agent consisting of taking egg yolk treated with an edible water soluble organic compound containing a hydroxyl group capable of preventing denaturing of egg protein during freezing and an edible acid for increasing the water imbibing capacity of the yolk to retain its fluidity and viscosity after freezing and thawing, and adding thereto a comparatively small proportion of essential oil having a condimental value and preserving action to prevent decomposition during thawing, but first dissolving said oil in a relatively larger amount of a suitable solvent of an edible nature.

4. The method of producing an emulsifying agent consisting of taking egg yolk treated with an edible water soluble organic compound containing a hydroxyl group capable of preventing denaturing of egg protein during freezing and an edible acid for increasing the water imbibing capacity of the yolk to retain its fluidity and viscosity after freezing and thawing, and adding a suitable amount of mustard oil or equivalent oil having a condimental value and preserving action to prevent decomposition.

5. As a new article of manufacture, an emulsifying agent comprising egg yolk treated with an edible water soluble organic compound containing a hydroxyl group capable of preventing denaturing of egg protein during freezing and an edible acid for increasing the water imbibing capacity of the yolk to retain its fluidity without diminishing its viscosity, a thawing decomposition preventative having a condimental value, and frozen below the temperature of bacterial decomposition.

6. As a new article of manufacture, an emulsifying agent comprising egg yolk treated with an edible water soluble organic compound containing a hydroxyl group capable of preventing denaturing of egg protein during freezing and an edible acid for increasing the water imbibing capacity of the yolk to retain its fluidity without diminishing its viscosity, mustard oil to prevent spoilage and add condimental value, and frozen below the temperature of bacterial decomposition.

7. As a new article of manufacture, an emulsifying agent comprising egg yolk treated with an edible water soluble organic compound containing a hydroxyl group capable of preventing denaturing of egg protein during freezing and an edible acid for increasing the water imbibing capacity of the yolk to retain its fluidity without diminishing its viscosity, a comparatively small amount of mustard oil to prevent spoilage and add condimental value, said oil being dissolved in a relatively larger quantity of a suitable solvent of an edible nature.

8. As a new article of manufacture, an emulsifying agent comprising egg yolk treated with an edible water soluble organic compound containing a hydroxyl group capable of preventing denaturing of egg protein during freezing and an edible acid for increasing the water imbibing capacity of the yolk to retain its fluidity without diminishing its viscosity, a comparatively small amount of mustard oil to prevent spoilage and add condimental value, said oil being dispersed in a relatively larger quantity of a suitable solvent of an edible nature, a suitable coloring and condimental substance in the nature of powdered paprika.

In witness whereof, I hereunto subscribe my name this 21st day of September, 1925.

ALBERT K. EPSTEIN.